United States Patent [19]
Seitz

[11] Patent Number: 5,835,154
[45] Date of Patent: Nov. 10, 1998

[54] CIRCUIT ARRANGEMENT FOR DERIVING PULSES OF HORIZONTAL AND VERTICAL FREQUENCY

[75] Inventor: Martin Seitz, Ober-Ramstadt, Germany

[73] Assignee: U.S. Philips Corporation, New York, N.Y.

[21] Appl. No.: 741,154

[22] Filed: Oct. 29, 1996

[30] Foreign Application Priority Data

Nov. 4, 1995 [DE] Germany ................. 195 41 223.0

[51] Int. Cl.$^6$ ................................................ H04N 5/10
[52] U.S. Cl. ........................................ 348/530; 348/529
[58] Field of Search ................................. 348/530, 531, 348/529, 525; H04N 5/10

[56] References Cited

U.S. PATENT DOCUMENTS

| | | | |
|---|---|---|---|
| 4,405,945 | 9/1983 | Sato | 348/530 |
| 4,459,612 | 7/1984 | Shinkai et al. | 348/529 |
| 4,600,944 | 7/1986 | Williams | 358/154 |
| 4,792,852 | 12/1988 | Narusawa | 348/530 |
| 5,132,794 | 7/1992 | Okada et al. | 358/153 |

FOREIGN PATENT DOCUMENTS

0461897A2  6/1991  European Pat. Off. .

*Primary Examiner*—Michael Lee
*Attorney, Agent, or Firm*—Edward W. Goodman; Michael E. Belk; Gregory L. Thorne

[57] ABSTRACT

A circuit arrangement for deriving horizontal frequency and vertical frequency pulses from a synchronizing signal, in which all clocked components are provided with the same clock during the digital processing of the synchronizing signal. Too derive the horizontal (H) pulse signal, a logic circuit 2 is provided which combines the sync signal with a masking pulse signal derived from the clocked sync signal. To derive the vertical (V) pulse signal in the clock raster, a counting flip-flop 14 is driven by the clocked sync signal after combination with the vertical pulse signal via an interference pulse signal suppression circuit 10. To derive the 2V pulse signal, a logic circuit 17 is provided which combines the V pulse signal with a pulse signal derived from the clocked sync signal.

6 Claims, 2 Drawing Sheets

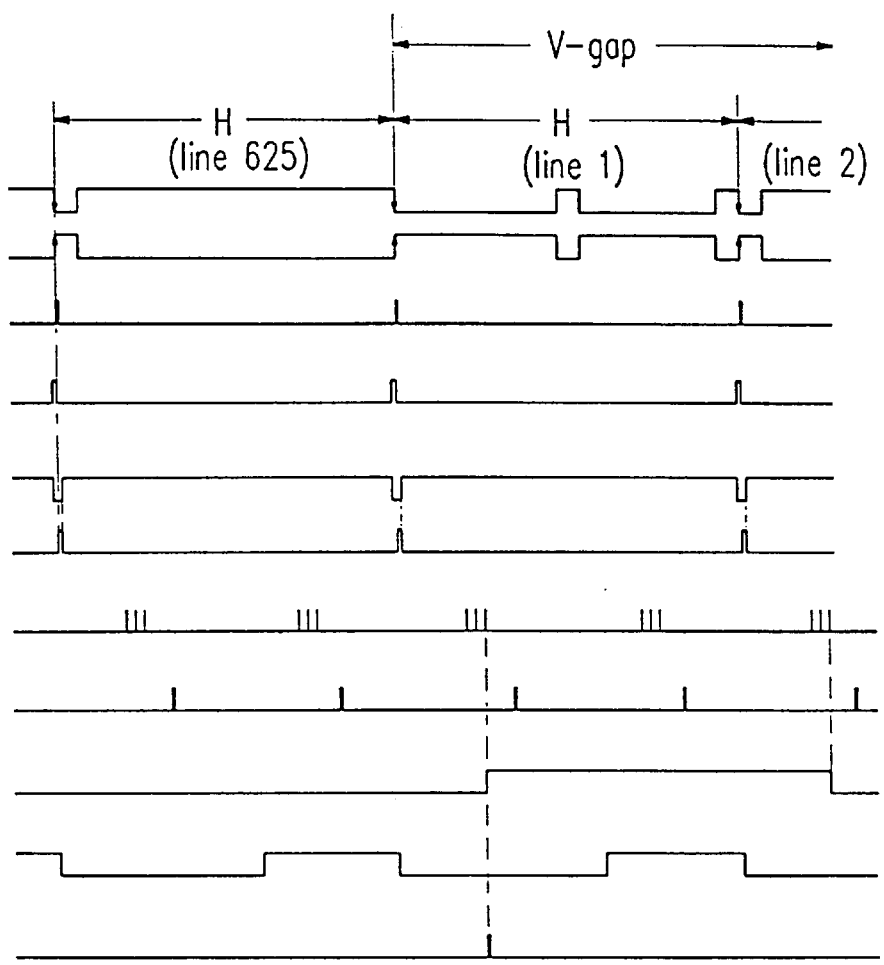

CIRCUIT ARRANGEMENT FOR DERIVING PULSES OF HORIZONTAL AND VERTICAL FREQUENCY

BACKGROUND OF THE INVENTION

1. Field of the Invention

The invention relates to a circuit arrangement for deriving pulses of horizontal and vertical frequency from a television synchronizing signal, while applying a clock signal.

2. Description of the Related Art

In video-technical installations and apparatuses, it is often necessary to derive pulses of the horizontal and vertical frequency from a synchronizing signal which is commonly used in the video technique and comprises components of the horizontal and vertical frequency. In known circuit arrangements (U.S. Pat. No. 4,600,934), different time constant members, for example, monostable multivibrators, are used for separating the components. However, they require adjustment regarding the time constant spread of each specimen and possibly a different layout for different television systems such as, for example, systems using 625 lines and 525 lines.

Moreover, EP 0 461 897 A2, corresponding to U.S. Pat. No. 5,132,794, discloses a circuit for separating the horizontal frequency sync component from a sync signal comprising components of the horizontal and vertical frequency, while, for avoiding disturbances in the horizontal frequeicy pulse signal, a digital sync signal processing with clocked counters, decoders and further digital components is performed. It is true that pulse disturbances between the horizontal sync pulses are largely suppressed, but signals which are not clock-synchronous are used within the circuit.

SUMMARY OF THE INVENTION

It is therefore an object of the invention to provide a circuit arrangement for deriving line frequency, picture frequency and frame frequency information from a video sync signal which can be satisfactorily realized in commercial FPGA or EPLD architectures.

This object is solved by a circuit arrangement for deriving pulses of horizontal and vertical frequencies from a television synchronizing signal, while receiving a clock signal, characterized in that said circuit arrangement comprises a logic circuit having a first input to which the television synchronizing signal is applied, a second input to which a masking pulse signal derived from a clocked and inverted synchronizing signal is applied, and an output for providing a horizontal frequency pulse signal in the clock raster, said output forming a first output of said circuit arrangement; a clocked pulse shaper having an input to which the clocked and inverted synchronizing signal is applied, and an output for providing the masking pulse signal; a counter having a first input for receiving the clock signal, and a second input for receiving a horizontal frequency reset pulse generated by the pulse shaper, said horizontal frequency reset pulse causing the counter to start counting; a first decoder having inputs connected to outputs of the counter, and an output for supplying a pulse to the pulse shaper at a given count shortly before the end of each line, so that the masking pulse signal acquires a state in which the logic circuit is enabled; a second decoder having inputs also connected to the outputs of the counter, a first output for supplying a group of pulses both in a first and in a second half of a line period of the television synchronizing signal, and a second output for supplying single pulses shortly after said pulse groups, said first and second outputs being connected to inputs of a clocked interference pulse suppression circuit; a further logic circuit having a first input for receiving the clocked and inverted synchronizing signal, a second input for receiving a vertical frequency pulse signal, and an output connected to a further input of the interference pulse suppression circuit; a clocked counting circuit having an input for receiving an output signal of the interference pulse suppression circuit, and an output for supplying the vertical frequency pulse signal in the clock raster, said output forming a second output of said circuit arrangement; and a third decoder having inputs also connected to the outputs of the counter, and an output for supplying an output signal which is AND-combined with the vertical frequency pulse signal for generating frame frequency pulse signal at a third output of said circuit arrangement.

The circuit arrangement according to the invention has the advantage that it operates purely digitally, with all clocked components being provided with the same clock so that the design is strictly clock-synchronous. Moreover, with the same layout, the circuit arrangement according to the invention is suitable for signals in accordance with the 525 or 625 line standard. It is further advantageous that the circuit arrangement also operates with synchronizing signals which do not strictly adhere to the standard (such as, for example, VCRs or computers). A further advantage is that the circuit arrangement can be realized very simply both in programmable digital components (small series) and in highly integrated circuits (large series). The arrangement has a high degree of immunity against disturbances, while it is possible to influence the degree by varying the number of components.

These and other aspects of the invention will be apparent from and elucidated with reference to the embodiments described hereinafter.

BRIEF DESCRIPTION OF THE DRAWINGS

In the drawings:

FIG. 2A–2L show some of the pulse signals occurring in the circuit arrangement of FIG. 1.

DESCRIPTION OF THE PREFERRED EMBODIMENT

Figure 1:
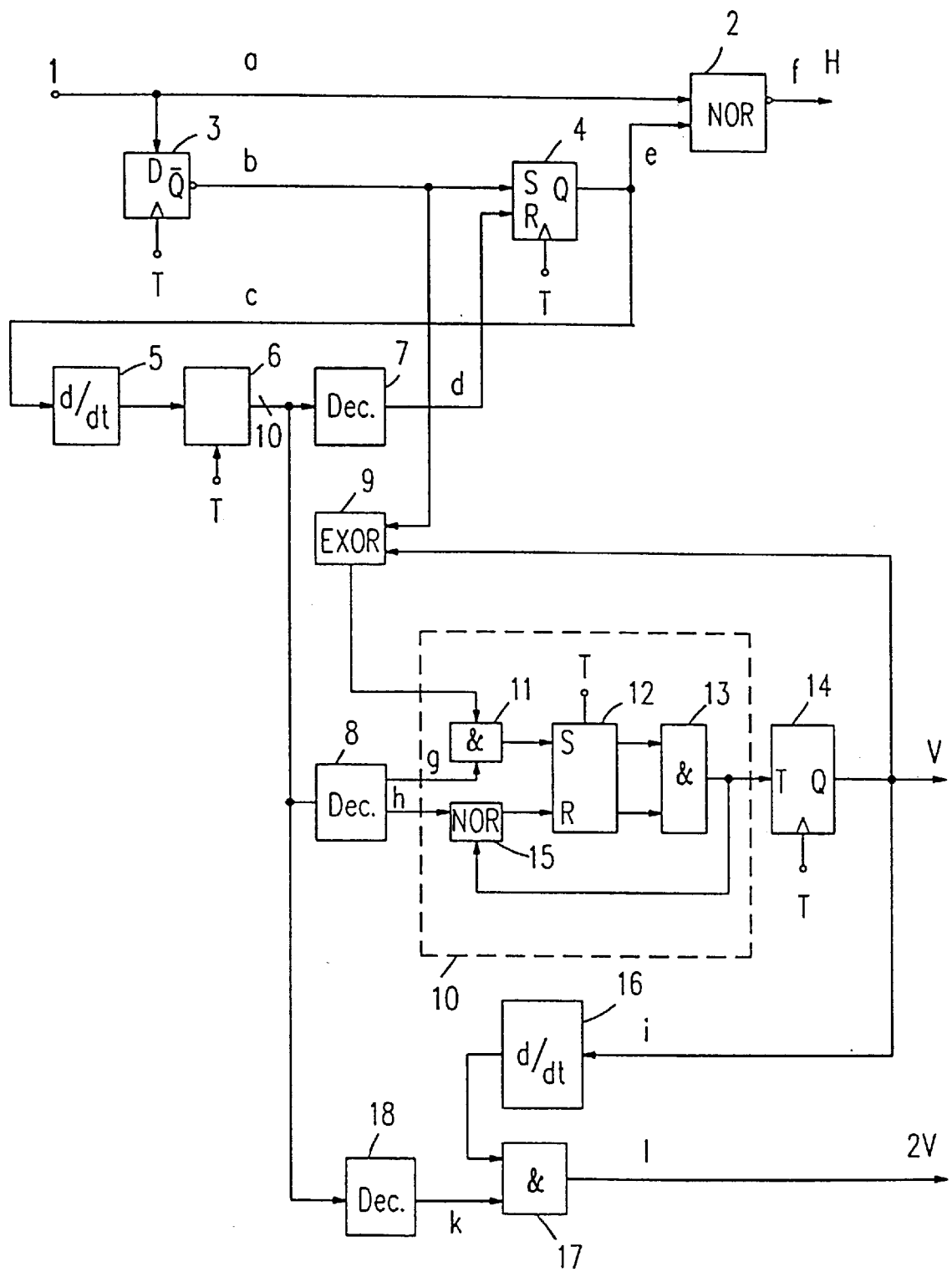
FIG. 1 is a block diagram of the circuit arrangement according to the invention.

A synchronizing signal, as shown in FIG. 2A and comprising components of the horizontal and vertical frequency, is applied to the circuit arrangement of FIG. 1 via terminal 1. Since the phase position of the separated H pulses (but for an inevitable delay time) should correspond to the input synchronizing signal, the active edge cannot be supplied via registers. This input sync signal is therefore directly applied to an input of a logic circuit 2 (NOR), the other input of which conveys a masking pulse signal, as shown in FIG. 2E, serving for control of this logic circuit 2. The inverted pulse signal H of the horizontal frequency, shown in FIG. 2F, can then be derived from the inverting output of the logic circuit 2. A path comprising only one combinatorial connection, for example, a NOR gate, therefore exists between the input 1 and the output for the H pulses.

Since synchronous signal processing is to be substantially aimed at for reasons of possibility of integrating the circuit arrangement according to the invention, all further paths are formed in a clock-synchronous manner. The input sync signal is therefore supplied in a clock raster in a further path with a D register 3, in that the D register 3 conveying the sync signal at its D input is clocked with a clock signal T (for example, 13.5 MHz clock frequency). The clocked and inverted sync signal, shown in FIG. 2B, can then be derived from the inverting output of the D register 3, which sync signal sets a clock-synchronous RS flip-flop 4 with the inverted, i.e., positive H edge derived from the negative edge of the H sync signal. The output signal of the RS flip-flop 4 is NOR-combined with the input sync signal via the logic circuit 2, the result directly constituting the pulse signal of the horizontal frequency. The active edge of the horizontal-frequency input sync signal is thus directly passed on. One to two clock cycles later—the exact time depends on the phase relation between input sync signal and clock signal T—the output of the RS flip-flop 4 becomes inactive again, i.e., the logic circuit is inhibited.

Simultaneously, a counter 6, which is also clocked with clock signal T, is started with the active edge of the output signal of the RS flip-flop 4, shown in FIG. 2C. At a clock frequency of 13.5 MHz, a line of the 525 line standard consists of 858 clocks, and a line of the 625 line standard consists of 864 clocks in accordance with CCIR Recommendation 656. A decoder 7 connected to the outputs of the counter 6 generates a reset pulse, shown in FIG. 2D, for the RS flip-flop 4 after approximately 853 clocks after which the counter 6 was reset. The length of the reset pulse shown in FIG. 2D is not critical: it should at least be so long that it is certainly taken over by the RS flip-flop 4, (i.e., approximately one clock cycle) and should at most be so long that, in the most unfavorable case, it cannot intersect the set pulse shown in FIG. 2B. This tolerance may be utilized to minimize the number of components for the decoder 7. Accordingly, the reset pulse may last approximately 5 to 10 clocks and, due to inhibition of the RS flip-flop 4, generates a pulse enabling the NOR gate at the output of said flip-flop.

With an inhibition time of approximately 853 clocks and an enabling time of approximately 5 to 10 clocks for the logic circuit 2, this so-called masking pulse signal, shown in FIG. 2E, which can be derived from the output of the RS flip-flop 4, causes all level changes in the input sync signal, be it tail or notch pulses in the V gaps or disturbances, to be suppressed in the meantime because of the reset instant of the RS flip-flop 4 shortly before the next H pulse.

In a standard sync signal with 525 or 625 lines in accordance with CCIR report 624, the vertical frequency component starts in the first or in the second part of the line, dependent on whether the beginning of the first or the second field is concerned. In order not to lose the frame information, the beginning of the vertical frequency pulse must therefore be searched in both line halves.

A second decoder 8, which is fed from the outputs of the (10-bit) counter 6, generates a group of three pulses, shown in FIG. 2G, at a first output, both in the first and the second half of the line. Separate pulses, shown in FIG. 2H, are generated at a second output in the two line halves which follow the groups at the first output with respect to time.

The output signal V of the vertical frequency, shown in FIG. 2I, is EXOR combined in a logic circuit 9 with the clock-synchronous and inverted input sync signal, i.e., if the vertical frequency output signal and the input sync signal have the same level, the result of the combination is 0, but if they are unequal, the result is 1. The result of this combination is now AND-combined with the output signal, shown in FIG. 2G, of the first output of the decoder 8 in a logic circuit 11 provided in a pulse suppression arrangement 10. If the levels of the input sync signal and the vertical frequency output signal correspond at the instant of the pulse groups of the signal shown in FIG. 2G, then the result of this AND combination is 0, i.e., the vertical frequency output signal maintains its state. If the levels of the input sync signal and the vertical frequency output signal are, however, different—at the beginning or end of the vertical frequency pulse—pulses at the output of the logic circuit 11 are generated. These pulses are applied to the clock enable input of a 2-bit counter 12 which also receives the clock signal T. When all three pulses have arrived, the counter has reached the position 3. This position is decoded with a further AND gate 13 and applied to the T input of a counting flip-flop 14 which is also clocked with the clock signal T. The counting flip-flop 14 each time flips to the other position. Simultaneously with the flipping of the counting flip-flop 14, the counter 12 is brought to its initial position again by a NOR combination via the logic circuit 15 with the output signal, shown in FIG. 2H, at the second output of the decoder 8, so that a reset pulse is generated.

If a disturbance rather than the vertical frequency component of the input sync signal were concerned, it would be improbable that all three pulses of the first output of the decoder 8 would reach the counter 12. In this case, the counter 12 does not reach its highest position, and the counting flip-flop 14 does not change its position. Before the next group of pulses can be generated, the counter 12 is reset by the single pulse at the second output of the decoder 8.

The immunity of deriving V pulses against interference signals may be improved in that the signal, shown in FIG. 2G, does not comprise groups of three pulses but comprises more pulses. Accordingly, the word length of the counter 12 should be increased and the connection 13 must be changed. It is then useful to use the counter positions predetermined by a given word length as an orientation. For example, the counter 12 mail be changed from two bits to three bits. It is then useful (though not strictly necessary) to give the signal shown in FIG. 2G seven pulses and to change the connection 13 into an AND gate having three inputs. Due to these measures, seven sampling values should have the same result so as to achieve a change of the V pulse.

The frame frequency pulse 2 V may be gained in a simple manner from the vertical frequency pulse V, in that this pulse is differentiated in a differentiating circuit 16 in such a way that only one narrow pulse is produced at the position of the positive edge of the vertical frequency pulse (start of the vertical frequency pulse) shown in FIG. 2L. The pulse thus gained is AND-combined via a logic circuit 17 with the output signal of a third decoder 18 in accordance with FIG. 2K, producing a signal which is logic 1 only during the first half of the line. If the start of the vertical frequency pulse is in the first part of the line, i.e., if the start of the first field is concerned, a frame frequency pulse 2 V is generated, whereas in the other case no pulse is generated.

I claim:
1. A circuit arrangement for deriving pulses of horizontal and vertical frequencies from a television synchronizing signal, while receiving a clock signal, characterized in that said circuit arrangement comprises:
   a logic circuit having a first input to which the television synchronizing signal is applied, a second input to which a masking pulse signal derived from a clocked and inverted synchronizing signal is applied, and an output for providing a horizontal frequency pulse signal in the clock raster, said output forming a first output of said circuit arrangement;
   a clocked pulse shaper having an input to which the clocked and inverted synchronizing signal is applied, and an output for providing the masking pulse signal;

a counter having a first input for receiving the clock signal, and a second input for receiving a horizontal frequency reset pulse generated by the pulse shaper, said horizontal frequency reset pulse causing the counter to start counting;

a first decoder having inputs connected to outputs of the counter, and an output for supplying a pulse to the pulse shaper at a given count shortly before the end of each line, so that the masking pulse signal acquires a state in which the logic circuit is enabled;

a second decoder having inputs also connected to the outputs of the counter, a first output for supplying a group of pulses both in a first and in a second half of a line period of the television synchronizing signal, and a second output for supplying single pulses shortly after said pulse groups, said first and second outputs being connected to inputs of a clocked interference pulse suppression circuit;

a further logic circuit having a first input for receiving the clocked and inverted synchronizing signal, a second input for receiving a vertical frequency pulse signal, and an output connected to a further input of the interference pulse suppression circuit;

a clocked counting circuit having an input for receiving an output signal of the interference pulse suppression circuit, an output for supplying the vertical frequency pulse signal in the clock raster, said output forming a second output of said circuit arrangement; and a third decoder having inputs also connected to the outputs of the counter, and an output for supplying an output signal which is AND-combined with the vertical frequency pulse signal for generating frame frequency pulse signal at a third output of said circuit arrangement.

2. A circuit arrangement as claimed in claim 1, characterized in that the clocked and inverted synchronizing signal is derived from the input synchronizing signal by means of a D flipflop which is clocked with the clock signal (T).

3. A circuit arrangement as claimed in claim 1, characterized in that the pulse shaper comprises a clocked RS flip-flop which has a set input for receiving the clocked and inverted synchronizing signal, a reset input connected to the output of the first decoder and a non-inverting output connected to the second input of the logic circuit.

4. A circuit arrangement as claimed in claim 1, characterized in that the interference pulse suppression circuit comprises a counter having a set input connected to an output of an AND circuit having inputs connected to the first output of the second decoder and the output of the further logic circuit, said counter further having a reset input connected to an output of a logic circuit having inputs connected to the second output of the second decoder and the output of the interference pulse suppression circuit, said counter having outputs connected to the input of the clocked counting circuit via a further logic circuit.

5. A circuit arrangement as claimed in claim 1, characterized in that the output of the clocked counting circuit is connected, via a differentiating circuit, to a first input of a logic circuit, a second input of said logic circuit being connected to the output of the third decoder.

6. A circuit arrangement as claimed in claim 1, characterized in that a further differentiating circuit is arranged between the output of the pulse shaper and the reset input of the counter.

\* \* \* \* \*